United States Patent [19]

Campling

[11] Patent Number: 4,836,721

[45] Date of Patent: Jun. 6, 1989

[54] ENGRAVING MACHINE

[75] Inventor: Brian Campling, Dunsfold, United Kingdom

[73] Assignee: Engraving Developments Ltd., Surrey, England

[21] Appl. No.: 70,027

[22] Filed: Jul. 6, 1987

[30] Foreign Application Priority Data

Jul. 4, 1986 [GB] United Kingdom ................. 8616380

[51] Int. Cl.[4] .......................... B23C 9/00; B23B 47/26

[52] U.S. Cl. ................................ 409/125; 144/134 C; 408/129; 409/184

[58] Field of Search ............... 409/184, 175, 180, 132, 409/125, 204, 210, 214, 218, 185, 186, 187, 107, 109, 137, 80; 144/134 R, 136 R, 134 A, 134 B, 134 C; 408/99, 129

[56] References Cited

U.S. PATENT DOCUMENTS

| | | | |
|---|---|---|---|
| 2,723,598 | 11/1955 | Mann | 144/134 C |
| 3,166,987 | 1/1965 | Ramsey | 409/184 X |
| 3,891,015 | 6/1975 | Calcagno | 409/135 |
| 4,037,982 | 7/1977 | Clement | 409/137 X |
| 4,244,669 | 1/1981 | Puritz | 409/137 |
| 4,273,482 | 6/1981 | Llyod | 409/193 X |
| 4,304,512 | 12/1981 | Vierstraete | 409/80 |
| 4,382,728 | 5/1983 | Anderson | 409/137 |
| 4,515,505 | 5/1985 | Frisbie et al. | 409/184 |
| 4,717,291 | 1/1988 | Zafir | 408/99 |

*Primary Examiner*—William Briggs

*Attorney, Agent, or Firm*—Harvey Kaye; Jerry Cohen

[57] ABSTRACT

An engraving machine has a cutter head (18) on a mount (17) movable in X and Y directions above a platen for holding a workpiece, the mount with the cutter head being movable in the Z direction between a raised and a lowered working position. The cutter head has a cutter (32) variable projectable from a nose cone (33), and the cutter head is also movable in the Z direction on its mount.

8 Claims, 1 Drawing Sheet

ENGRAVING MACHINE

This invention relates to engraving machines.

Machines for engraving e.g. the surface of plates have a platen for holding the plate, and a carriage supporting a rotatable milling cutter head above the platen. The cutter head can be moved by servo motors in the X and Y directions, and between a raised non-cutting position and a lowered cutting position. The movements can be controlled by a computer program to produce predetermined patterns of engraving on the plate. The height of the lowered cutting position of the cutter head is adjusted manually and set before the engraving operation is started. If it is to be altered, it can only be adjusted manually after completion of a pass over the plate.

The cutter head itself permits a second manual adjustment, namely the projection of the milling cutter from a nose cone which in use bears under spring pressure against the surface of the plate. The projection thus decides the depth of the engraving. Sometimes, particularly for hard materials, the desired depth of engraving can only be achieved by a number of passes over the plate with the cutter at progressively increased projections. Again the adjustment can only be done manually between passes.

If the material being engraved is particularly delicate, the pressure of the nose cone on its surface may cause scratching, so a nose cone is dispensed with. In that case, the depth of incision is decided by the absolute height of the cutter head. The evenness of the incision over the plate then depends upon the plate being held flat on the platen for example by a vacuum.

An example of a machine of this kind, which has an adjustment of the cutter head height, is shown in GB Pat. No. 1061313.

The invention aims to provide an engraving machine which reduces or avoids the disadvantages of existing machines, by making the depth of cut control more flexible and responsive to computer control.

Accordingly, the invention proposes an engraving machine having a cutter head movable in X and Y directions above a platen for holding a workpiece, the cutter head on a mount being movable bodily in the Z direction between a raised position and a lowered working position, wherein the cutter head is adjustable by a servo motor to adjust the projection of a cutter relative to the cutter head.

Preferably the same motor is usable to adjust the cutter head relative to the mount in the Z direction, and a selector decides which adjustment is made.

In order that the invention shall be clearly understood, an exemplary embodiment thereof will now be described with reference to the accompanying drawings, in which.

Figure 1:
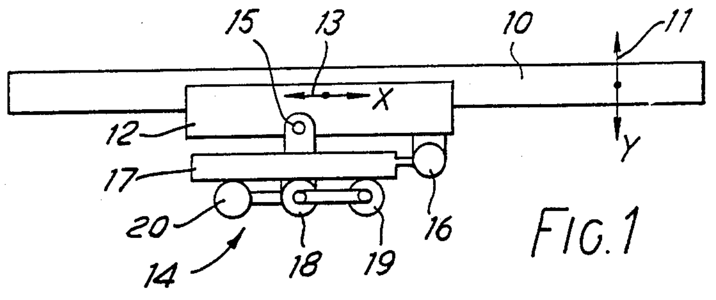
FIG. 1 shows a schematic plan view of an engraving machine.
Figure 2:
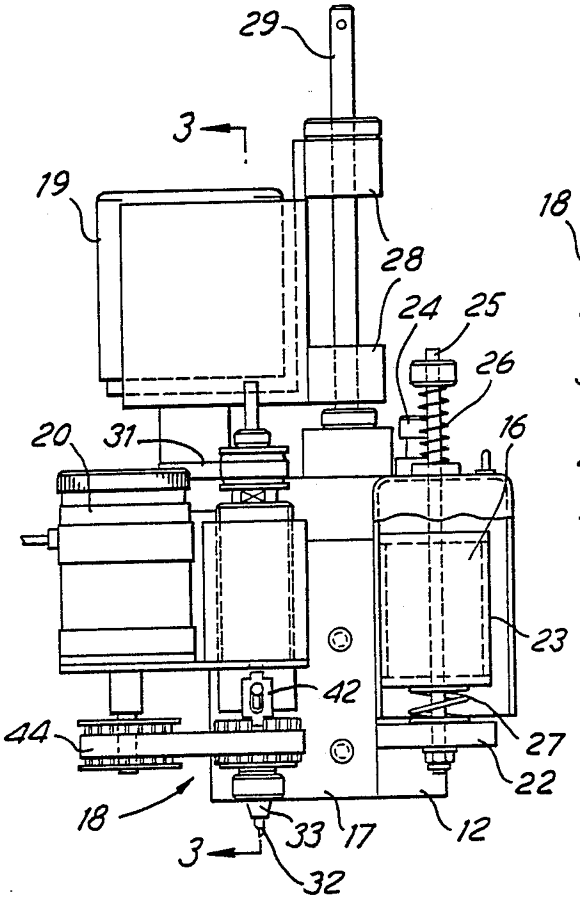
FIG. 2 shows an elevation of the cutter unit of the machine in FIG. 1.

FIG. 1 shows schematically the main functional units of an engraving machine cutter section, that is excluding the platen for receiving the workpiece. The cutter section has a beam 10 movable in the Y direction 11, and a carriage 12 movable along the beam 10 in the X direction 13. A cutter unit 14 is movable on a slide 15 in the Z direction perpendicular to the plane of the drawing by means of a solenoid unit 16. The cutter unit 14 comprises a cutter plate 17 which carries a cutter head 18 driven by a drive motor 19. The head 18 is movable again in the Z direction on the plate 17 by means of a stepping motor 20. The solenoid unit 16 and the cutter unit 14 with its constituent parts are shown in detail in FIG. 2.

The solenoid unit 16 mounted on carriage 12 is linked by an arm 22 to the cutter plate 17. The armature 23 of the solenoid is moved up and down between end positions, determined by an adjuster nut 24, carrying with it a rod 25 linked to the arm 22. Movement is damped by a spring 26 and the downward pressure of the cutter unit on the workpiece is maintained by a spring 27. The motor unit is mounted by two brackets 28 for sliding movements on a vertical rod 29 fixed on the carriage 12.

Figure 3:
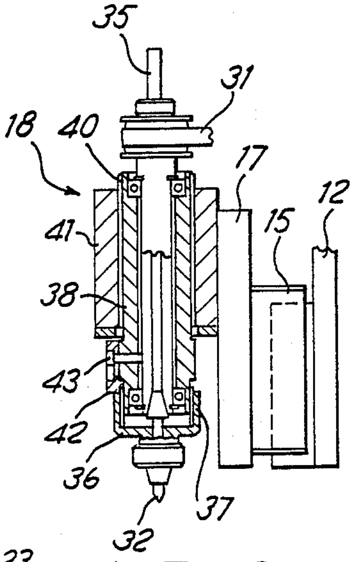
FIG. 3 shows a sectional view of the cutter head on the line 3—3 in FIG. 2.

The cutter head is driven by a belt 31 from the drive motor 19. A milling cutter 32 projects from a nose cone 33 by an amount which determines the depth of the engraved pattern in the workpiece. As seen in FIG. 3, the cutter 32 is integral with a drive spindle 35, which rotates within the nose cone 33 and an integral externally toothed cap 36. The latter is internally threaded at 37 and screwed on an external thread on a sleeve 38. By rotation of the cap 36, the nose cone is raised and lowered relative to the cutter 32 and spindle 35 which is journalled in bearings in the sleeve 38.

The sleeve 38 itself is externally threaded at 40 and is rotatable within an outer housing 41 which is fixed on the cutter plate 17. A selector key 42 is slidable on a pin 43 on the sleeve 38 between an upper position in which the sleeve 38 is locked to the outer housing 41, and a lower position (as shown) in which the cap 36 is locked to the sleeve 38. The stepping motor 20 also fixed to the plate 17 drives the cap 36 by a toothed belt 44.

With the key 42 as shown, the motor 20 rotates the cap 36 and the sleeve 38 together relative to the outer housing 41 so that the cutter 32 and the nose cone 33 are moved in unison relative to the cutter plate 17. For this operation, the nose cone 33 is not required and can be detached from the cap 36. With the key in the upper position, the cap 36 moves up and down relative to the spindle 35 and cutter 32, thus adjusting the projection of the cutter.

It will now be seen that the mechanism described allows full control of adjustment of the cutter in the Z axis. The control can be programmed in terms of drive of the stepping motor which, depending upon the setting of the selector key 42, controls either the absolute height of the cutter or the projection of the cutter through the nose cone. Although not described, it is clear that movement of the key 42 can also be effected by a solenoid, the operation of which can also then be programmed with the other controls so that the entire operation of the machine is carried out under computer control.

I claim:

1. An engraving machine comprising a platen for holding a workpiece, a tool mechanism, a support structure for said tool mechanism above the platen, the tool mechanism and platen being relatively movable in x and y directions, the tool mechanism comprising a mount movable in the z direction;

a cutter head movable also in the z direction on the mount;

a cutter in the cutter head, the degree of projecting of the cutter being adjustable;

first motor means controlling the position of the mount in the z direction;

second motor means for adjusting the cutter head on the mount, and for adjusting the degree of projection of the cutter from the cutter head; and selector means which decide which adjustment the second motor means can perform.

2. An engraving machine as defined in claim 1, wherein the cutter in the cutter head is on the end of as motor driven spindle, the spindle passing in bearings through a sleeve and through a nose cone which is threaded on the sleeve, and the nose cone being mounted to be rotatable by the second motor means.

3. An engraving machine as defined in claim 1, wherein the cutter in the cutter head is on the end of a motor driven spindle, the spindle passing in bearings through a sleeve which is externally threaded and rotatable by the second motor means within an external housing to provide adjustment of the cutter head in the z direction.

4. An engraving machine as defined in claims 2 or 3, wherein the selector means is a slide member which physically either locks the nose cone to the sleeve, or locks the sleeve to the external housing.

5. An engraving machine as defined in claim 1, wherein the selector means is operated by a servo drive.

6. An engraving machine as defined in claim 1, wherein the first motor means is an electromagnetic solenoid.

7. An engraving machine as defined in claim 5, wherein all adjustments of the cutter, cutter head, mount and selector means are effected by a programmable control system.

8. An engraving machine comprising a platen for holding a workpiece, a support structure for a tool mechanism above the platen, the tool mechanism and platen being relatively movable in x and y directions, the tool mechanism comprising a mount movable in the z direction; a cutter head having a cutter on the end of a motor driven spindle, and externally threaded sleeve having bearings in which the spindle rotates, an externally threaded housing surrounding the sleeve, and a nose cone, surrounding the cutter, which is threaded on the sleeve; first motor means controlling the position of the mount in the z direction; second motor means for driving either the nose cone relative to the sleeve and housing, or the nose cone and sleeve relative to the housing; and selector means which lock the sleeve and the housing, or the nose cone and the sleeve, respectively.

* * * * *